(12) United States Patent
Gray

(10) Patent No.: US 8,267,226 B2
(45) Date of Patent: Sep. 18, 2012

(54) LATCHING MECHANISM

(75) Inventor: Andrew Gray, York (GB)

(73) Assignee: Radlok S.A.R.L., Luxembourg (LU)

( * ) Notice: Subject to any disclaimer, the term of this patent is extended or adjusted under 35 U.S.C. 154(b) by 790 days.

(21) Appl. No.: 12/294,265

(22) PCT Filed: Mar. 14, 2007

(86) PCT No.: PCT/GB2007/000769
§ 371 (c)(1),
(2), (4) Date: May 21, 2009

(87) PCT Pub. No.: WO2007/110572
PCT Pub. Date: Oct. 4, 2007

(65) Prior Publication Data
US 2009/0231095 A1 Sep. 17, 2009

(30) Foreign Application Priority Data
Mar. 24, 2006 (GB) .................................. 0605844.0

(51) Int. Cl.
*B60B 33/00* (2006.01)
(52) U.S. Cl. ............. 188/1.12; 188/4 B; 188/5; 16/18 R
(58) Field of Classification Search ................. 188/1.12, 188/4 B, 5, 111, 162, 163; 16/18 R, 35 R, 16/47
See application file for complete search history.

(56) References Cited

U.S. PATENT DOCUMENTS

| 5,315,290 | A | | 5/1994 | Moreno et al. |
| 5,357,182 | A | * | 10/1994 | Wolfe et al. ................... 318/379 |
| 5,806,862 | A | | 9/1998 | Merryman et al. |
| 5,823,302 | A | | 10/1998 | Schweninger |
| 5,881,846 | A | | 3/1999 | French et al. |
| 7,810,612 | B2 | * | 10/2010 | Gray ............................ 188/1.12 |
| 2009/0315302 | A1 | * | 12/2009 | Gray ............................ 280/727 |
| 2010/0005620 | A1 | * | 1/2010 | Gray ................................ 16/47 |

FOREIGN PATENT DOCUMENTS

| GB | 2384175 A | 7/2003 |
| WO | 2004/031017 A1 | 4/2004 |

OTHER PUBLICATIONS

International Search Report for PCT/GB2007/000769.

* cited by examiner

*Primary Examiner* — Pamela Rodriguez
(74) *Attorney, Agent, or Firm* — Dykema Gossett PLLC

(57) ABSTRACT

A method and apparatus for retarding rotation of at least one wheel, the apparatus including at least one braking member, a latch member secured to the braking member and movable between a first position and a second position, and a latch actuating member arranged to determine the position in which the latch member is positioned. The braking member is movable into a braking position in which rotation of the at least one wheel is retarded when the latch member is in the second position.

24 Claims, 11 Drawing Sheets

LATCHING MECHANISM

BACKGROUND OF THE INVENTION

1. Field of the Invention

The present invention relates to a method and apparatus for providing a latching mechanism. In particular, but not exclusively, the present invention relates to a latching mechanism which can be used to determine when a braking member should or should not operate to retard rotation of a wheel of a castor secured to a vehicle or some other movable object.

2. The Prior Art

There are many instances known in which vehicles, or other such means of transportation, which are provided with one or more wheels should have their movement inhibited or prevented. A known way for achieving this is to provide a brake mechanism on one or more of the wheels. When motion of a vehicle or object is to be slowed or stopped, a signal is transmitted to a brake which is applied. The application of the brake retards rotation of a wheel.

Many different types of braking mechanism are known and the manner in which braking is achieved is often dependent upon the type of vehicle which is to be slowed or stopped.

It will be understood that embodiments of the present invention are generally applicable in the sense that they can be adapted to retard rotation of one or more wheels of any type of means of transportation or object which is provided with the facility to move. However, the present invention is particularly well suited to retarding rotation of at least one wheel of a castor for a shopping cart. Shopping carts, sometimes referred to as shopping trolleys, are well known and are provided by supermarkets or other retail establishments for shoppers to transport goods to be purchased in a very convenient manner. However, supermarkets are known to have a problem in that from time to time shopping carts may be removed from the premises by unauthorised personnel. Such removal costs retail businesses money to either replace or locate the trolleys and return them to a desired location.

Shopping carts are typically provided with four castors, each of which includes one or two wheels arranged to rotate about a common axis between forks. The forks are connected at a common point to the shopping cart.

Many methodologies and apparatus have been suggested in the past for avoiding the unauthorised removal of shopping carts. Some of these involve the inclusion of a braking assembly in at least one castor of the shopping cart. However, such braking assemblies can be costly to produce and are prone to failure from time to time. Another problem is that the environment in which the shopping cart operates is a relatively inhospitable environment. For example, shopping carts are often pushed or pulled over very uneven surfaces where a jarring motion may be transferred into the castor of the shopping trolley. This makes parts within the castor prone to failure and can cause a brake to invalidly deploy or unset.

Some known braking assemblies for wheels include a latch-like assembly in which a latch can be positioned in one of two positions. In a first position a brake operates to brake a wheel, thus retarding rotation of the wheel. In another position the brake is not applied. Many known latching assemblies are prone to failure either because of the environmental harshness noted above or because unauthorised personnel will attempt to disable the latch mechanism.

In this sense latching mechanisms per se are known for a whole host of different applications. As such these latching mechanisms are arranged to select one or more states. Once a state of a latch is selected, this determines operation of some machinery or other component parts in the apparatus where the latch mechanism is located. However, many types of latch mechanism are complex which makes them costly to produce and maintain or means that they are prone to failure. It will be understood that whilst embodiments of the present invention are described by way of example with respect to a latching mechanism applicable to select a braking state for a wheel of a shopping cart, embodiments of the present invention are generally applicable to circumstances where a latch mechanism is required to select one or more states of operation of particular equipment.

It is an aim of the present invention to at least partly mitigate the above-mentioned problems.

It is an aim of embodiments of the present invention to provide a latching mechanism in which a position of a latch member is determined using a very convenient method which is relatively cheap to produce and is not prone to error.

It is an aim of embodiments of the present invention to provide a method and apparatus for retarding rotation of a wheel of a castor of the type which can be secured to a vehicle or other object to be moved. Preferably the wheel is a wheel of a castor of a shopping trolley.

SUMMARY OF THE INVENTION

According to a first aspect of the present invention there is provided an apparatus for retarding rotation of at least one wheel, comprising:

at least one braking member;

a latch member secured to said braking member and movable between a first position and a second position; and a latch actuating member arranged to determine the position in which said latch member is positioned; wherein said braking member is movable into a braking position in which rotation of said at least one wheel is retarded when said latch member is in said second position.

According to a second aspect of the present invention there is provided a method for retarding a wheel, comprising the steps of:

providing a braking member to which is secured a latch member, said latch member being movable between a first and second position;

selecting a position for said latch member via a latch actuating member; and moving the braking member into a braking position thereby retarding rotation of the wheel when said latch member is in said second position.

According to a third aspect of the present invention there is provided an apparatus for providing a latching mechanism, comprising:

a latch member movable between a first position and a second position; and a latch actuating member arranged to determine a position of said latch member; wherein at least one of said latch member and/or said latch actuating member comprises a magnetic element.

Embodiments of the present invention provide an apparatus and method for retarding the rotation of at least one wheel in a relatively simple and efficient manner. This is achieved by latching a braking member in one of two positions. In a first position a braking member used to prevent or reduce rotation of a wheel is non-engageable and thus a wheel can move freely. When a latch is moved to a second position movement of the vehicle, such as a shopping cart, will itself power the movement of the braking member into a braking position which will retard either fully or partially further motion of the wheel.

BRIEF DESCRIPTION OF THE DRAWINGS

Embodiments of the present invention will now be described hereinafter, by way of example only, with reference to the accompanying drawings, in which.

DETAILED DESCRIPTION OF THE PREFERRED EMBODIMENTS

Figure 1:
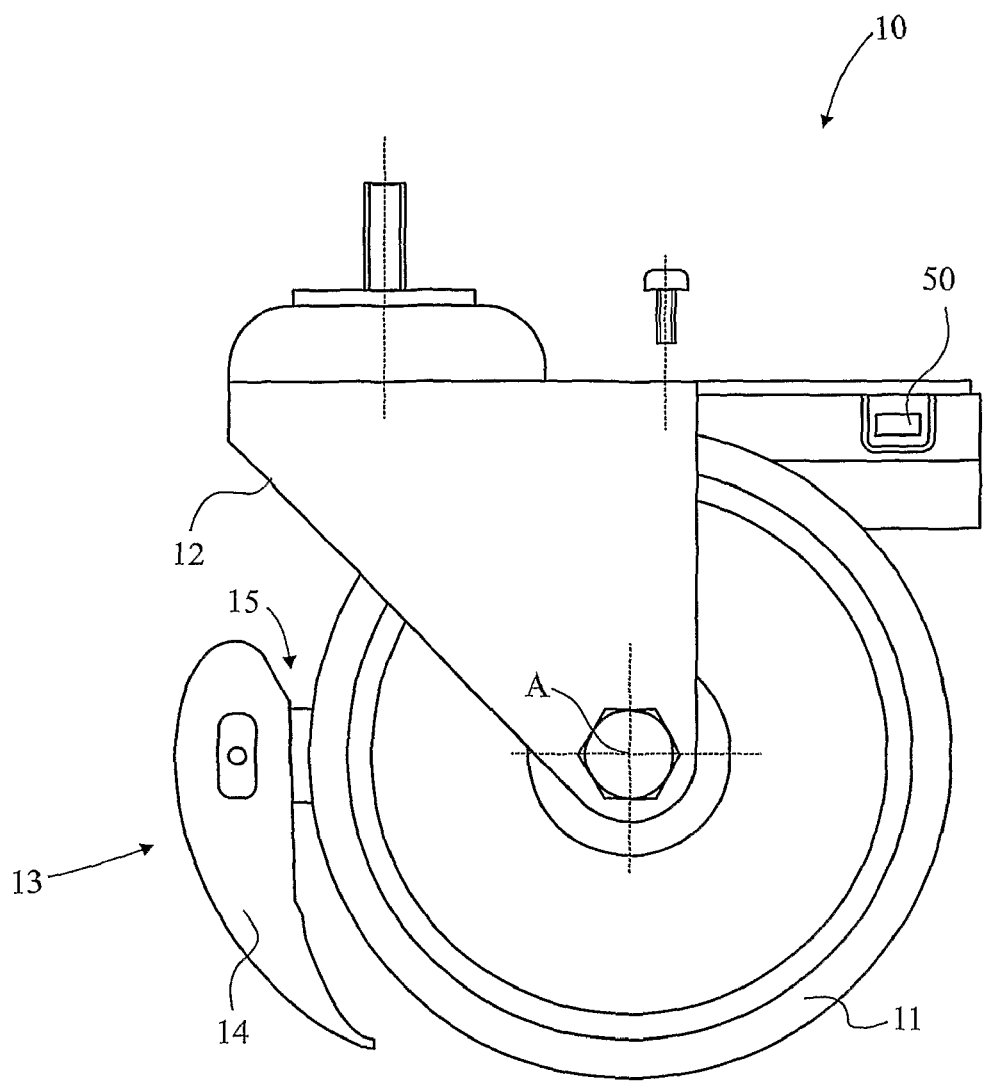
FIG. 1 illustrates a castor.

In the drawings like reference numerals refer to like parts.

FIG. 1 illustrates a side view of a castor 10. The castor includes two wheels 11 held between forks 12 and able to rotate about a common wheel axis A. It is to be understood that the present invention is not restricted to use of two wheels. Rather, the invention is generally applicable to castors including one or more wheels. A braking member 13 includes a brake foot 14 at an end region 15 of an arm thereof. It will be understood that castors of this type have many potential uses such as, for example, facilitating movement of shopping carts where castors 10 of this type would be located in the four underside corners of the shopping cart. However, such castors may be applied generally to the underside of very many different types of equipment or vehicles such as, for example, on hospital equipment, furniture or office equipment.

Figure 2:
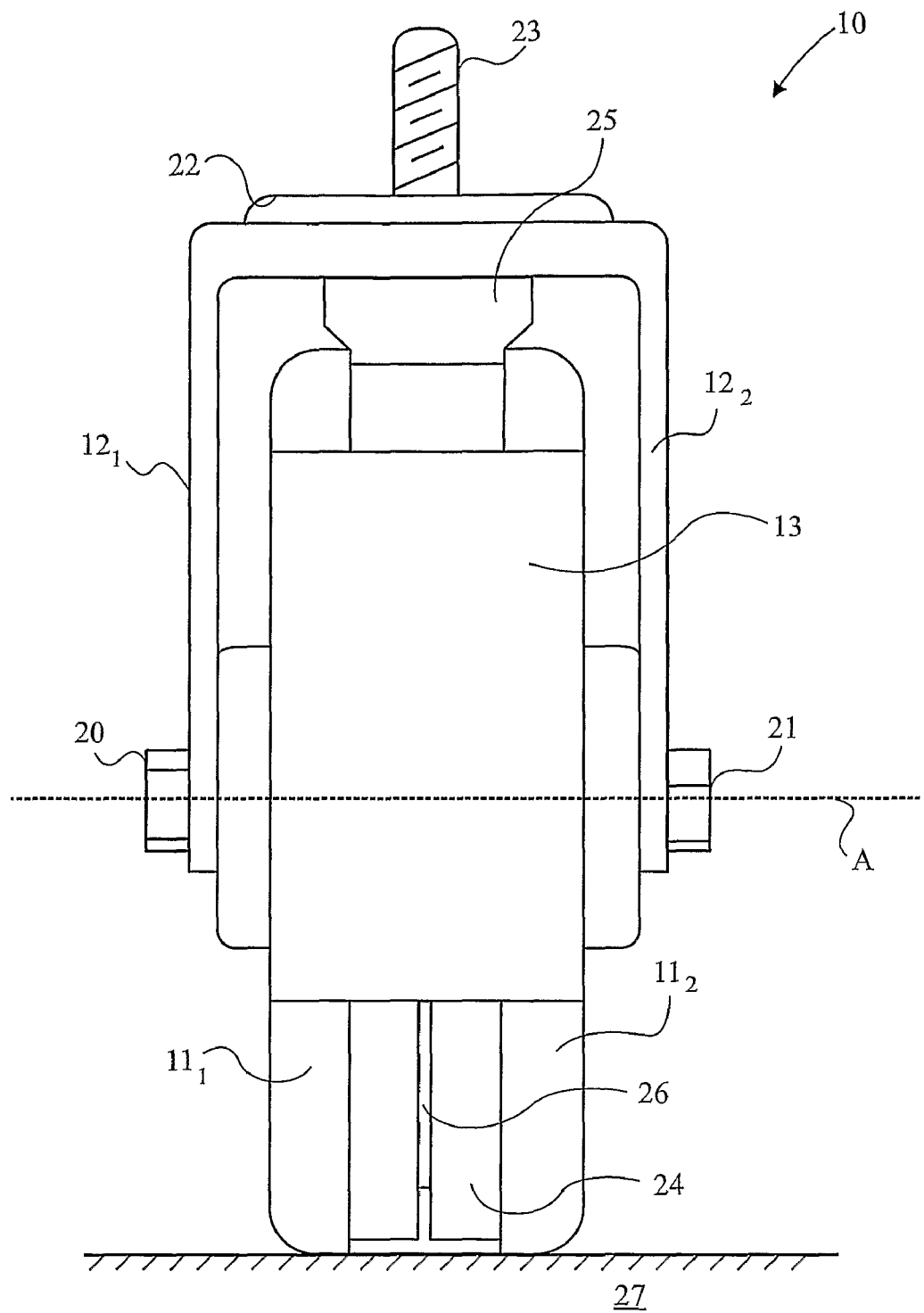
FIG. 2 illustrates another view of a castor.

FIG. 2 illustrates another view of the castor 10. Here the two forks $12_1$, $12_2$ may more clearly be seen to bridge the wheels 11. In particular in FIG. 2, the castor can be seen to include two wheels $11_1$, $11_2$ which are both arranged to rotate about a common wheel axis A. The two wheels are secured to the forks of the castor by a nut 20 and corresponding bolt 21. A first end of each fork 12 is secured to the nut and bolt whilst the other ends of the forks form a fork body 22 towards the top of the castor. A securing pin 23 which is threaded is located at the top of the castor so that the castor can be secured to a target object such as an item of furniture or a vehicle. Other securing mechanisms may be used.

The wheels $11_1$, $11_2$, are arranged side by side and separated by a central housing 24. The housing 24 is connected to the top of the castor by a rigid connecting piece 25. In this sense the housing and forks are rigidly secured to a further object by the connecting member 23 and the two wheels will rotate independently with respect thereto. The housing 24 has a groove 26 along part of the circumference which enables the braking foot 14 connected to the arm of the braking member to move from its non-braking position shown in FIG. 2 downwardly until the braking foot separates the wheels of the castor from the ground surface 27.

Figure 3:
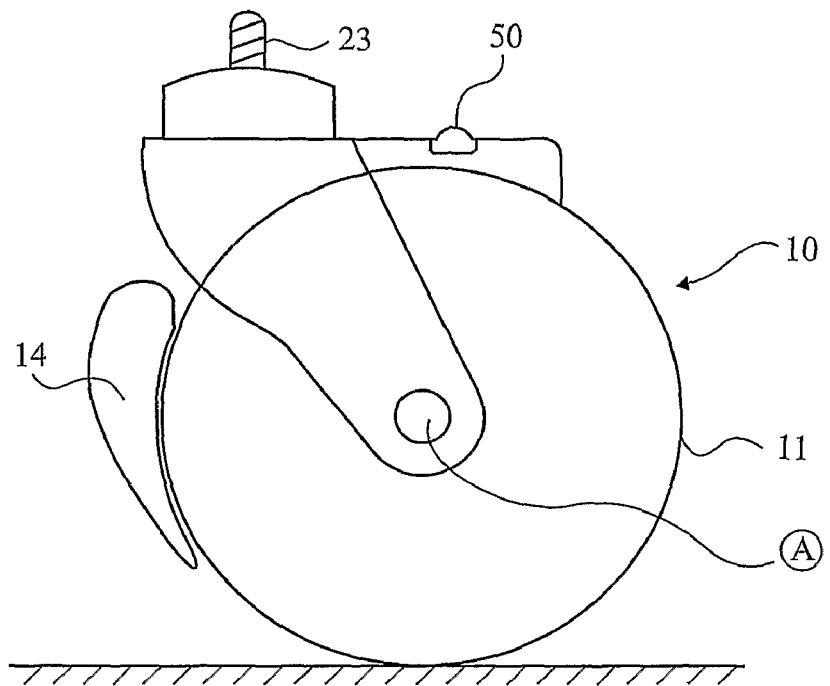
FIG. 3 illustrates a non-braking position of a braking member.
Figure 4:
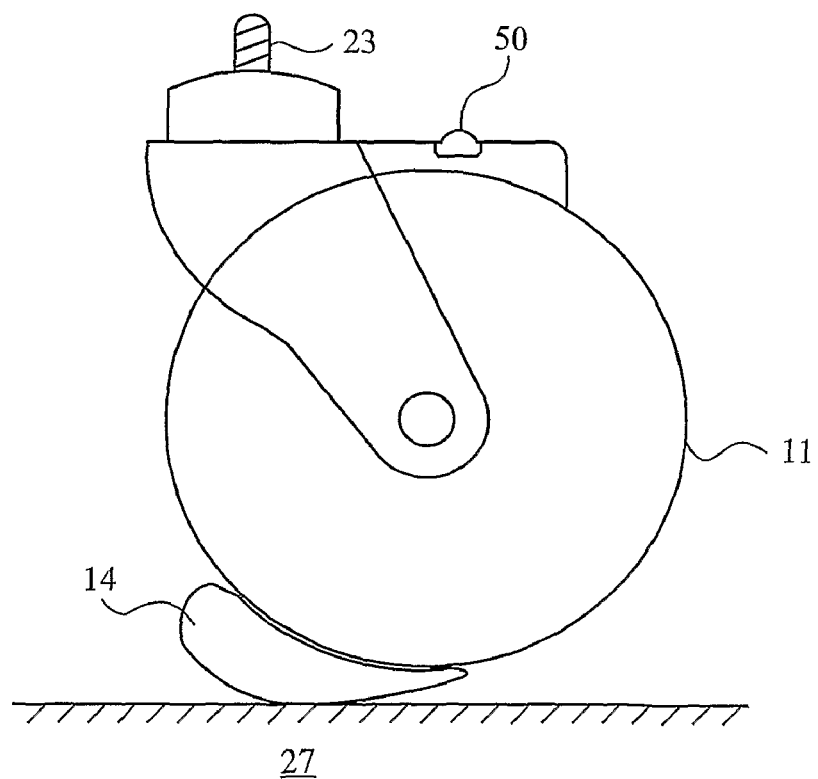
FIG. 4 illustrates a braking position of a braking member.

FIG. 3 illustrates the braking foot 14 in a non-braking mode of operation whilst FIG. 4 illustrates the brake foot in a braking position. In the braking position the foot 14 is rotated downwardly from the position shown in FIG. 3 until the foot is juxtaposed between the running surface 27 and the wheel 11. It will be understood that in this position a user pushing the object to which the castor is connected (not shown) will be hindered considerably in movement.

Figure 5:
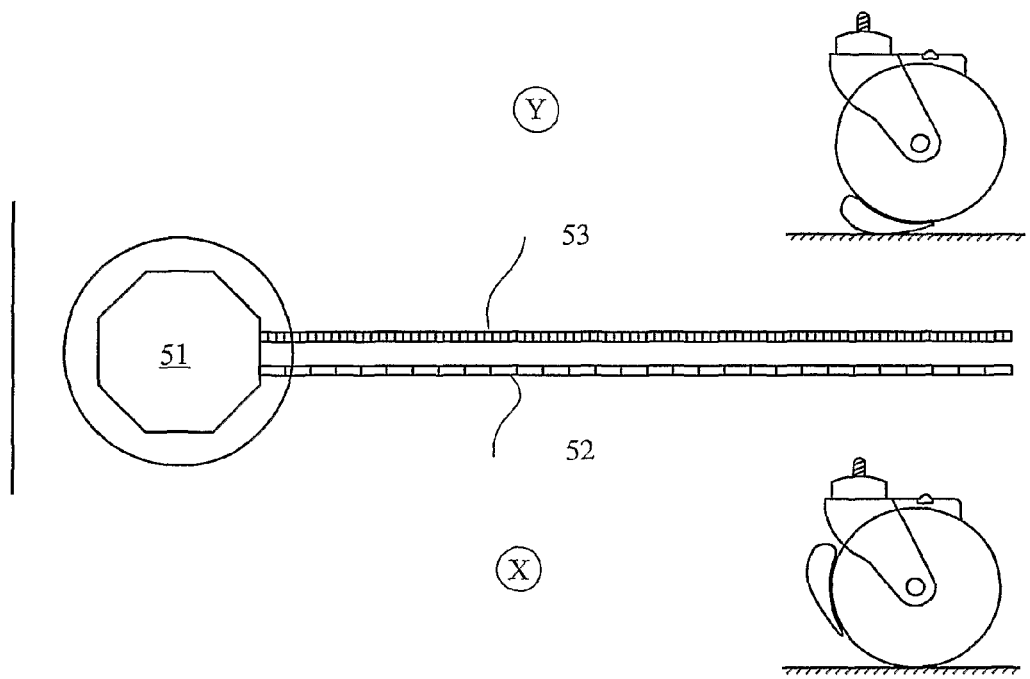
FIG. 5 illustrates transmission of a set and unset signal.

FIG. 5 illustrates deployment of the braking foot 14 from a braking position to a non-braking position. This occurs when a sensor 50 on the castor body detects a control signal. For example a wireless signal from a transmitter 51. The remote transmitter 51 transmits a first signal 53 which operates to initiate braking when a vehicle or other object to which the castor is connected moves from zone X to zone Y as shown in FIG. 5. This operation will be described in more detail hereinafter. The transmitter 51 also transmits a second signal 52 which is detected by the sensor 50 when the castor moves from zone Y to zone X. As the castor moves over an interface between the zones, the signal 52 is received by the sensor 50 which releases the braking mechanism to thus unlock the braking mechanism. In this sense a user is able to move an object to which the castor is connected within zone X but as soon as movement from zone X to zone Y occurs the braking mechanism retards rotation of at least one of the wheels 11 so that movement of the object becomes impossible or very difficult.

Figure 6:
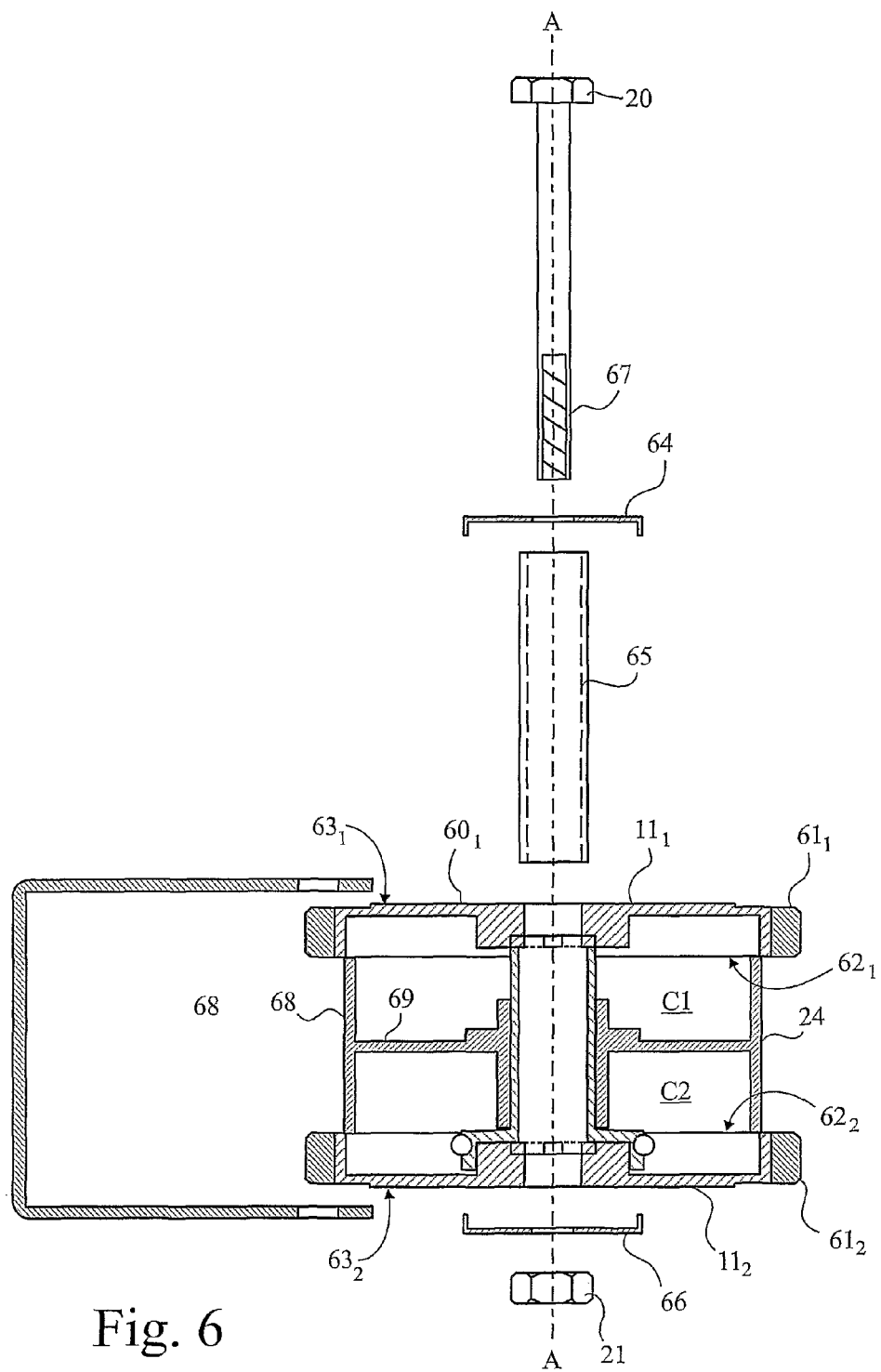
FIG. 6 illustrates parts of a castor.

FIG. 6 illustrates the separate parts of the castor in more detail. As may be seen each wheel 11 is formed from a respective wheel body 60 formed from rigid plastic or metal or some other rigid material. Each wheel is substantially circular in cross section and is generally disk-like. About the edge of each wheel 11 is a high friction surface 61 such as rubber which helps ensure the wheels run smoothly over a running surface. Each wheel 11 has an inner side 62 and an outer side 63. The inner side 62 is recessed.

The bolt 20 extends all the way through the two wheels and the wheel housing 24. A dust cover 64 prevents the ingress of dust onto the axle of the wheel which might hinder rotation of the wheels. The dust cover may also act as a string guard.

A spindle 65, which is a generally cylindrical element, is also located along the common axis of the wheels in a coaxial manner from end to end. A further dust cover/string guard 66 is located on the outer side $63_2$ of the wheel $11_2$ and the threaded end 67 of the bolt 20 is secured with nut 21. The forks 12 (sometimes referred to as the horns) are secured to the nut and bolt so that the wheels 11 will rotate about the axis A.

As illustrated in FIG. 6, the wheel housing 24 is a substantially cylindrical housing having an H-shaped cross section. The outer wall 68 is supported by a central plate 69. The central plate 69 separates two sides of the housing and each side provides a respective compartment C1, C2 in which further equipment of the castor may be located.

Figure 7:
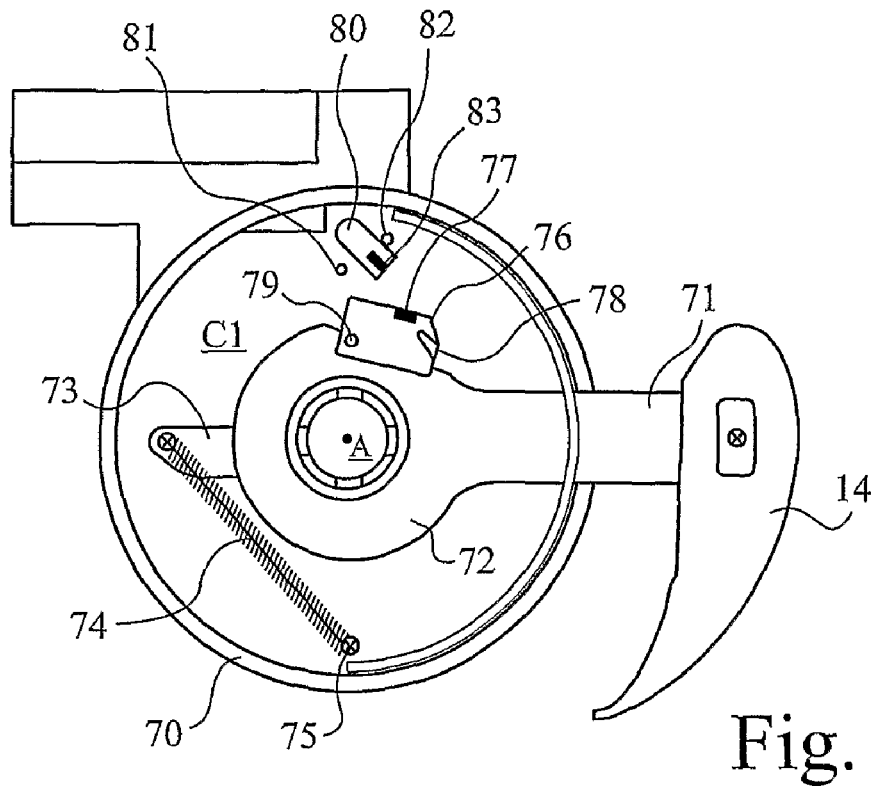
FIG. 7 illustrates a latching mechanism in a non-deployed state.

FIG. 7 illustrates a first compartment C1 of the housing. FIG. 7 illustrates the housing 24 without the wheel $11_1$. A circular rim 70 defines an open mouth of the housing and the braking member 13, including the braking foot 14, is shown in more detail. The braking member includes an arm 71 secured at a first end 15 to the brake foot. The arm extends into a hip region 72 which is arranged to rotate about the axis A. The hip region 72 of the brake includes an extension 73 which is secured to a first end of a biasing spring 74. The extension, hip, arm and foot may be integrally formed. The remaining end of the biasing spring 74 is secured in a fixed position with respect to the housing. In this way the spring operates to urge the braking arm and hip in an anti-clockwise direction thus urging the braking foot 14 upwardly away from a running surface. This is in a non-braking mode of operation. A latch member 76 is pivotally secured to the braking hip and includes a magnet 77 and braking arm 78. The latch member 76 is pivotable about a pivot point 79. The magnet is arranged to present a predetermined pole, for example north, outwards in the direction of the circumferential edge of the wheel housing.

A latch actuating member 80 which is formed from an elongate body is also pivotable between stops 81 and 82. The latch actuator includes a further magnetic element 83. The magnet 83 is arranged along a lower contact surface of the latch actuator 80. Thus one side of the actuator is magnetised generally with a first pole of the magnet whilst a remainder side of the actuator is magnetised generally according to the remaining pole. As illustrated in FIG. 7, when the latch actuator 80 is pivoted anti-clockwise until it abuts with end stop 82, the end at which the second magnet is located is a substantial distance away from the latch 76. In this position the latch is arranged such that the latch is repelled downwardly by virtue of the north pole of the magnet 77 on the latch being presented to the matching north pole end of the actuator magnet 83. In this way whilst the magnet 77 is arranged extending away from the latch/actuator contact surface of the latch the magnet 83 is arranged along the corresponding surface of the actuator thus revealing north and south poles.

Figure 8:
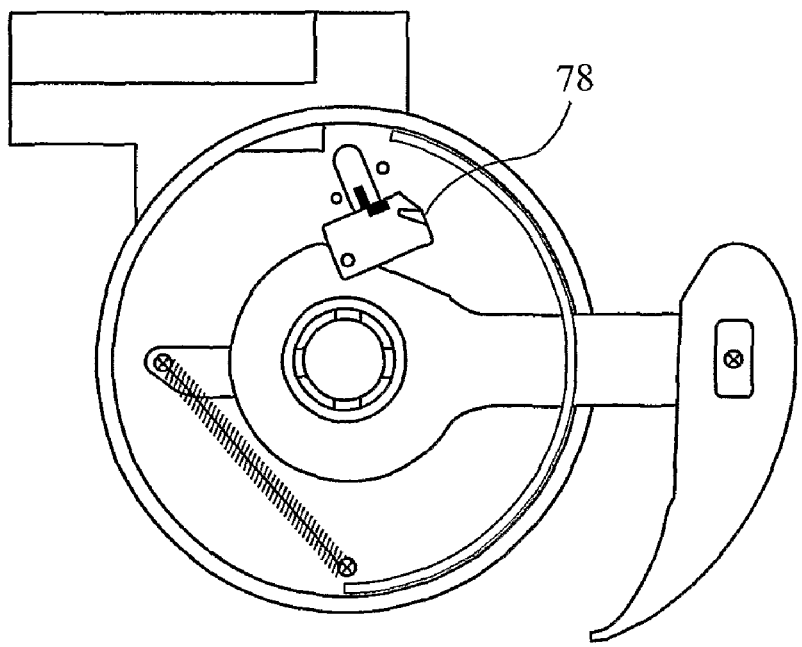
FIG. 8 illustrates a latching mechanism in a deployed state.

FIG. 8 illustrates a further setting of the latch and latch actuator in which the latch actuator 80 is pivoted clockwise until it abuts with a second end stop 81. In this position the south pole of the magnet 83 is more closely presented to the north pole facing out from the magnet 77. The magnets are thus arranged so as to be attracted with a significant strength and thus the latch 76 is attracted towards the end of the latch actuator 80. This moves the latch into a second and activated position. In this position the latch arm 78, which extends outwardly from the latch body in a direction out of the page shown in FIGS. 7 and 8, moves from a first position in which it is radially proximate to the central axis A to a second position in which the radial distance from the central axis is increased.

Figure 9A:
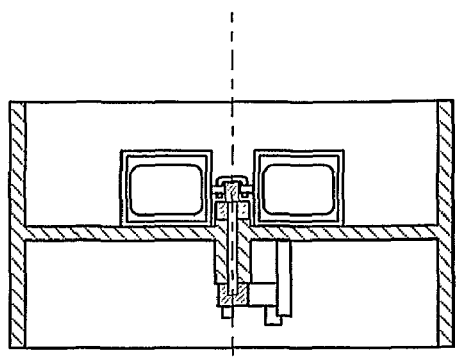
FIGS. 9A, 9B and 9C illustrate an inner surface of a wheel.
Figure 9B:
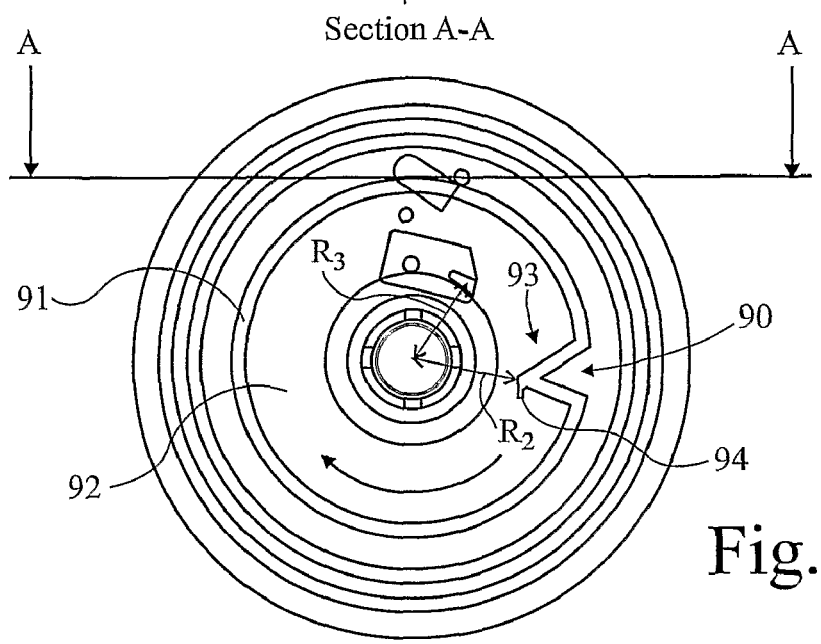
Figure 9C:
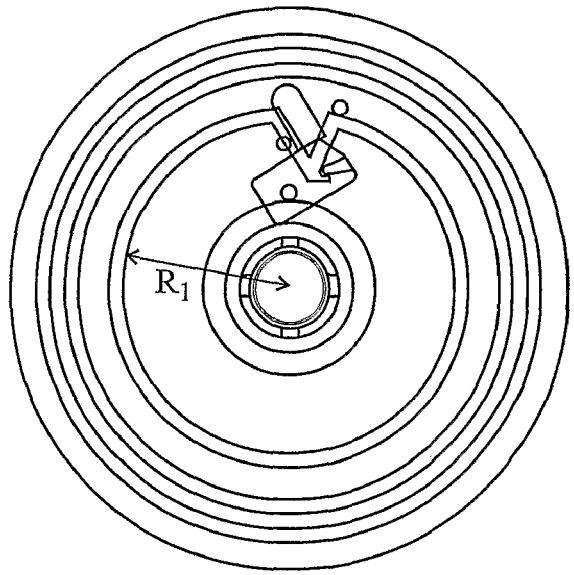

FIGS. 9A, 9B and 9C illustrate the inner side 62$_1$ of the first wheel 11$_1$ (not shown in FIGS. 7 and 8) in more detail. It will be noted that the annular recess inside the wheel includes one toothed region 90. One such region is sufficient but having a plurality of such regions means that braking occurs more promptly when required. The toothed region is formed from a substantially circular wall 91 which extends outwardly from a central flat zone 92. The wall 91 has a V-shaped portion 93 with the apex of the V-shaped tooth having an engaging lip 94. Each wall region 91 provides a distance $R_1$ which is greater from the central axis than a corresponding radius $R_2$ in a region where the toothed region is located. As will be understood by those skilled in the art when the arm 78 of the latch 76 is in the first position, as illustrated in FIG. 9B, the arm is relatively speaking close to the axis. In this sense the arm has a distance from the axis A around $R_3$. As such the arm in this position does not engage with a toothed region 90 on the inside of the first wheel. However, when the latch actuator 80 is rotated to move closer to the latch 76, the magnetic forces of attraction pull the latch 76 about its pivot point 79 into a position in which the arm 78 is radially further away from the axis A. As the wheel rotates a toothed region 90 will thus come into contact with the arm. This is illustrated in FIG. 9C. The arm 78 will in fact engage with an abutment surface 94 of one of the toothed regions. As the wheel 11 continues to move, the abutment of the surface 91 drives the braking member by virtue of the fact that the latch 76 is connected to the brake. The drive causes the braking arm 71 in a clockwise direction against the biasing force of the spring 74. Movement of the wheel caused by a user pushing thus drives the braking foot into a braking position.

When a brake is to be disengaged, for example, when the castor passes back into an authorised zone and thus receives a reset signal from the remote transmitter, the latch actuator 80 is rotated until it hits the first abutment 82. This moves the south pole of the magnet 83 away from the north pole of the magnet 77. The north pole of the magnet 83 is then effectively presented again to the north pole of the magnet 78 of the latch which causes the latch to be biased away from the latch actuator. This moves the latch arm 78 radially towards the wheel axis A thus disengaging the arm from a previously engaged toothed region. The biasing forces of the spring 74 then acts to return the braking arm into a non-braking position thus enabling the wheel to continue onwards unretarded.

It will be understood that the above-described embodiments include a magnetic element in both the latch actuator 80 and latch 76. However, it will also be understood that only one of the actuator and latch need have such a magnetic element. For example, the actuator could include a magnet and the body of the latch 76 could be wholly or substantially metallic. In this way the magnet would attract the metallic body in much the same way as the two magnets are attracted. It will also be understood that more than one magnet could be used on any one of the latch or latch actuator. As an alternative, magnets could be arranged so as to repel each other when in an 'unlock' configuration in which case a biasing member, such as a spring (not shown) would be employed to tend to drive the latch into a braking position with the magnetic forces of repulsion being used to overcome this biasing force to disengage the brake.

Figure 10:
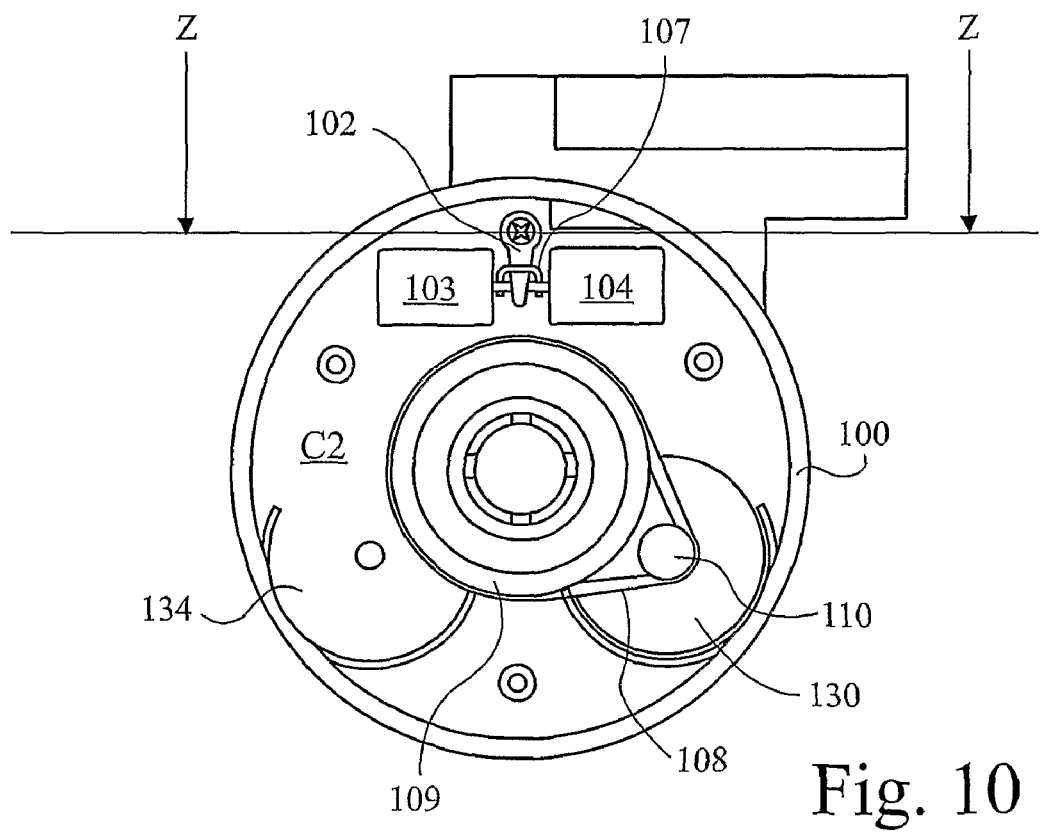
FIG. 10 illustrates a compartment in a castor housing.

FIG. 10 illustrates a reverse side of the housing 24 to that shown in FIGS. 7 and 8. The housing wall 68 ends in a second rim 100 which defines an open mouth of the housing. This open mouth defines the second compartment C2 referred to with respect to FIG. 6.

Figure 11:
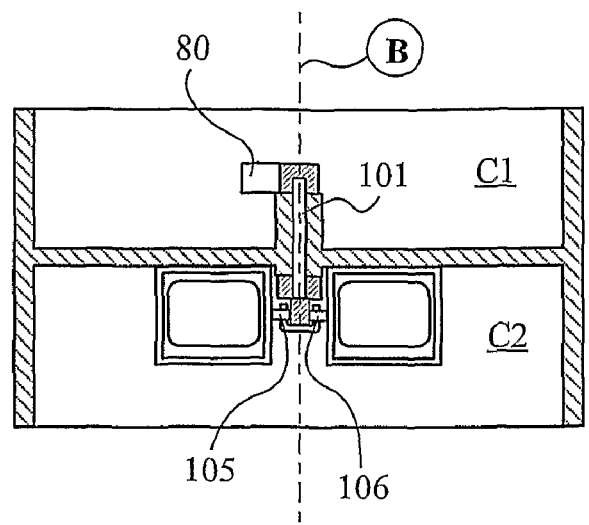
FIG. 11 illustrates a latch actuator.

FIG. 11 illustrates a section through line Z-Z shown in FIG. 10. The actuator 80 pivots about pivot point B and is connected from the first compartment C1 side to the second compartment C2 side of the housing by a drive shaft 101. The drive shaft 101 extends from the latch actuator through the central plate 69 of the castor housing where it is connected to a rotating ear 102. As the rotating ear 102 moves from right to left this rotates the drive shaft 101 which causes a corresponding rotation of the latch actuator 80. The rotating ear 102 is driven by a first solenoid unit 103 and a second solenoid unit 104. In this sense the movement of the switch is created by two opposing solenoids. Solenoids are only able to hold their position when they have power running through them. Due to the very limited availability of power in the castor it is preferable to pulse the solenoids to move from the first to a second position and then use a second solenoid to pulse back to the first position. The plunger 105 of the first solenoid is connected to the plunger 106 of the second solenoid 104 by a connector 107 which is generally U-shaped. In this sense a pulse may be driven into the coil of the first solenoid 103 to extend the plunger thus extending the connected plungers from left to right in FIG. 10. This causes a corresponding counter clockwise rotation of the rotating ear 102 and thus the latch actuator 80 is driven into the braking position. When a non-braking position is desired a pulse is driven into the solenoid 104 thus moving the rotating ear towards the left hand side of FIG. 10 thus driving the latch actuator away from the latch mechanism. Having oppositely facing solenoids thus provides an electrically efficient mechanism. When more power is available only one such solenoid unit is needed. It will be appreciated that other methods of driving the latch may be envisaged. For example, one or more motors could be used.

FIG. 10 also illustrates how power may be generated in the castor, in particular in one of the compartments C2. The power generating includes use of a drive belt which extends about an outer rim surface of a central drive ring 109. This drive ring 109 rotates as the wheels of the castor rotates as will be described hereinafter and the rotation of the drive ring is transferred to the drive belt 108. The drive belt is also connected to a further drive ring 110 which forms a drive ring connected to a rotor of a generator unit. As the drive belt 108 is turned by rotation of the central drive ring 109, the drive ring 10 is rotated in a corresponding manner. This rotates a rotor in the power generating unit. The rotor includes a magnetic element which is surrounded by a coil. As the magnet rotates within the coil current is induced in the wires of the coil and this current forms the basis of power for the castor. The power may be stored in a rechargeable battery (not shown) carried by the castor or may be used directly to provide power to the braking mechanism as afore-mentioned. Alternatively, the power may be transmitted through the castor up through the connecting fixing 23 into the object to which the castor is connected where the power may be utilised for a variety of different reasons.

It will be understood that embodiments of the present invention can use power generation on the castor as a wake-up signal for the on board (or rather on-castor) circuitry. In this way a power saving protocol can be implemented with power down taking place a predetermined time after power is generated and power on occurring when it is determined that power is being generated.

Figure 12:
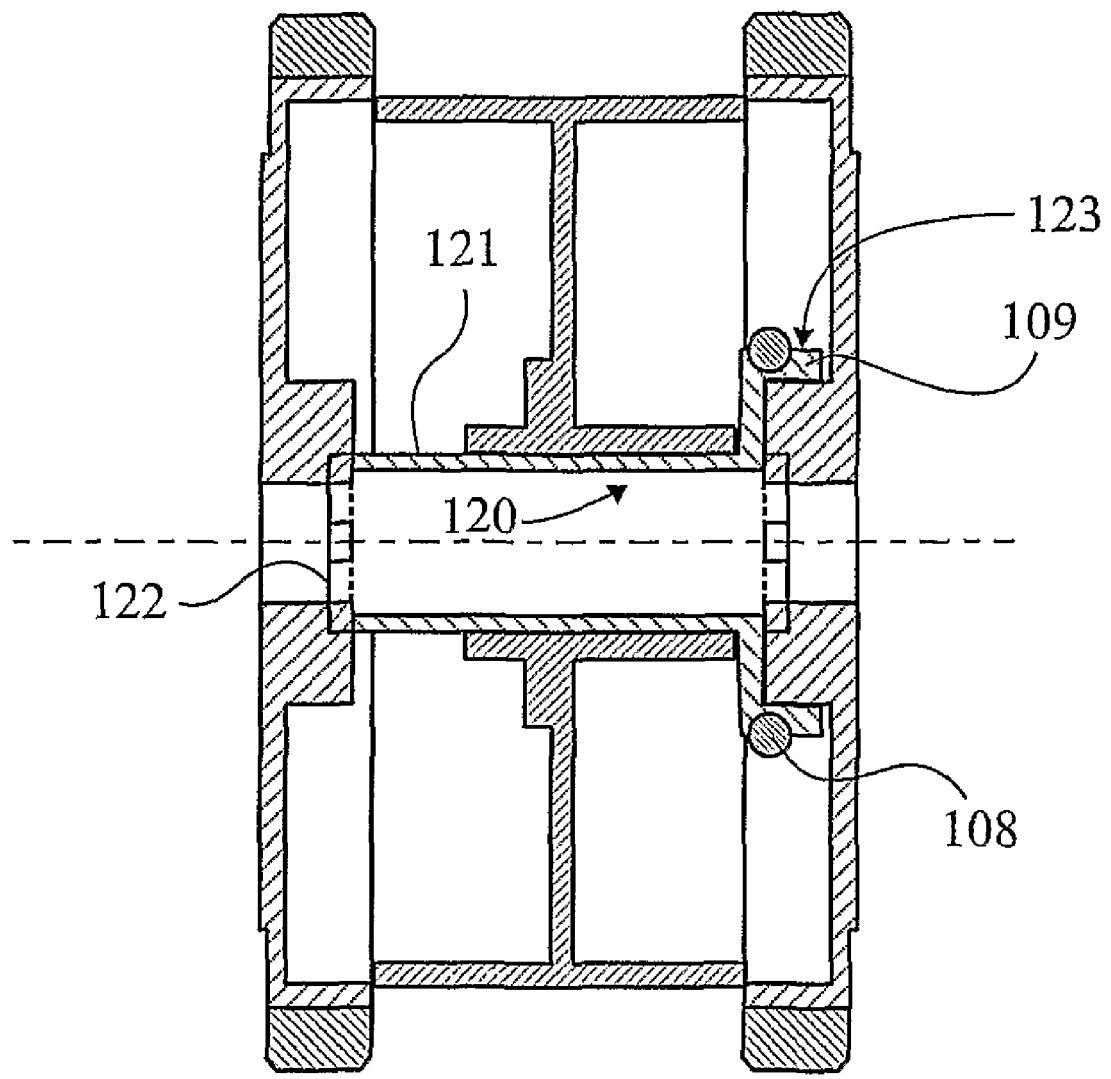
FIG. 12 illustrates how wheels are connected together.

FIG. 12 illustrates a cross section through the castor in more detail and helps clarify how the drive belt 108 is secured to the drive ring 109. The drive ring 109 forms a substantially circular rim to a connecting piece 120. The connecting piece 120 includes a substantially cylindrical sleeve section 121 which includes at a first end thereof a crenulated contact surface 122 which includes raised and lower portions. The inner surface $62_1$ of the wheel body $60_1$ has mating crenulations including extensions and recesses. The end of the connector sleeve 121 and wheel body $60_1$ can thus be interlocked so that movement of the wheel $60_1$ transfers into movement of the connecting cylinder 121 of the connector 120. A further end of the connecting cylinder 121 also includes similar crenulations which are provided to mate with corresponding crenulations on the inner surface $62_2$ of the second wheel $11_2$. In this way movement of the second wheel $11_2$ is transferred into rotation of the rotating sleeve 121. A further advantage of connecting the wheels to the connector 120 in this manner is that both wheels will thereby be forced to move together. In this sense one wheel cannot move independently of the other. This has the advantage that since the braking mechanism is only applied to one wheel of the castor, the other wheel is automatically retarded. This avoids the possibility of one wheel being able to continue to turn even though the other wheel is retarded. As an alternative the wheels may be secured to the connecting piece by other techniques such as welding or gluing.

The cylindrical connecting sleeve 121 and its crenulations are integrally formed with the drive ring 109 which extends outwardly from the second end region of the connector 120. The outer surface 123 of the drive ring 109 includes an indented channel in which the drive belt 108 runs. In this way the connection of the two wheels so as to move in a common manner has the advantage that if only one of the wheels is in contact with the ground and caused to rotate, that rotation will provide drive to the drive ring and thus to the drive belt.

Figure 13:
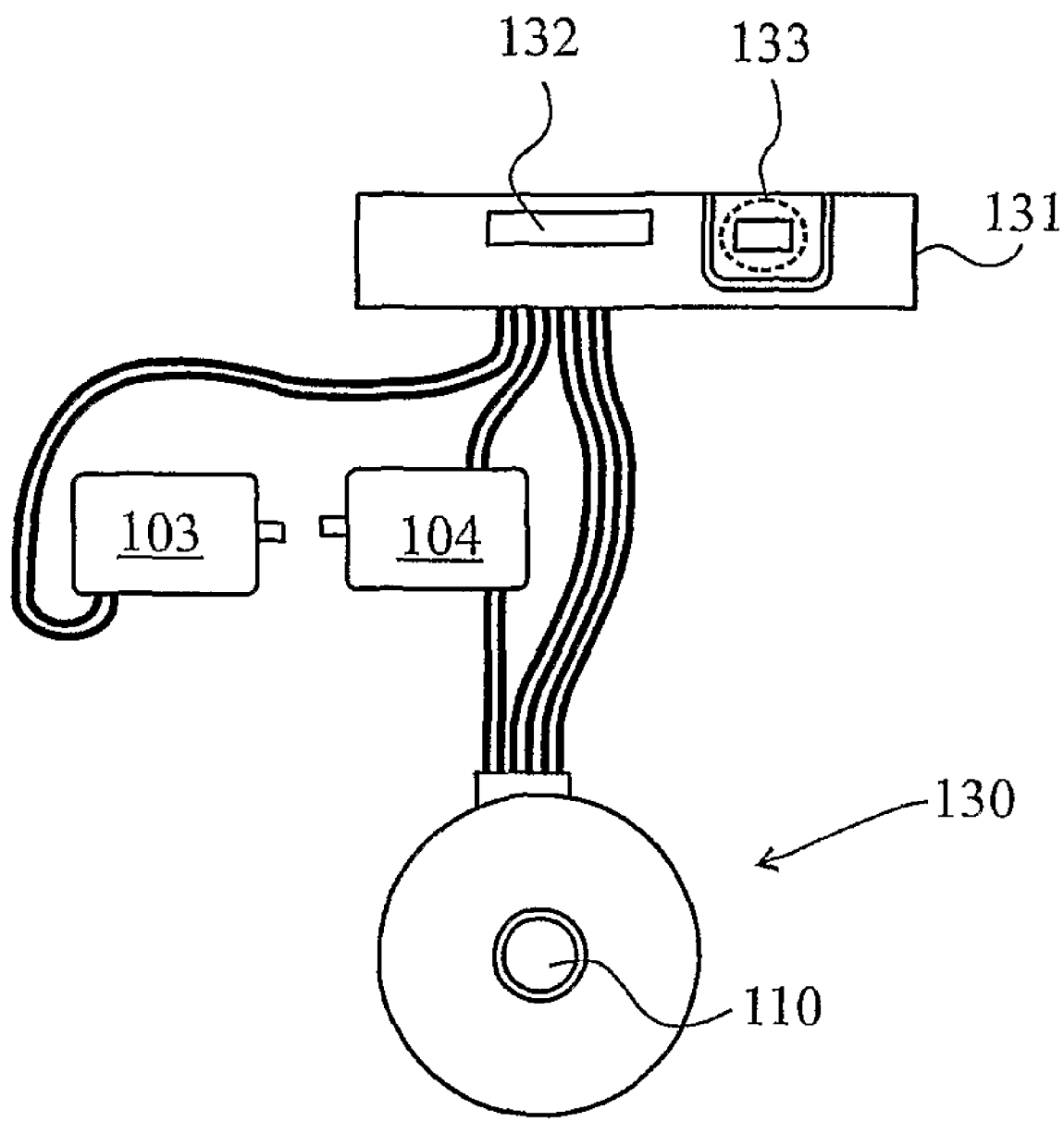
FIG. 13 illustrates power supply in a castor.

FIG. 13 illustrates how the generating unit 130 can be electrically connected to the solenoids 103 and 104 and to a further electrical housing 131 which is arranged on the castor and which holds a castor PCB 132 which is connected to a sensor 50 to receive the remote signals which cause the setting or unsetting of the brake. A wireless signal from a remote transmitter is advantageously focused by a lens 133 which remains uncovered at all times when the castor is connected to a vehicle or object. The lens 133 focuses the received signal onto the sensor 50 and the PCB then controls operation of the solenoids to deploy or unset the braking member as appropriate. Power for the on-board circuitry and components is powered by the generating unit 130. It will be understood that embodiments of the present invention can utilise more than one generating unit on a castor. Referring to FIG. 10, the ghost location 134 is provided to optionally house a second generating unit and it will be appreciated that if this is utilised the drive belt 108 would also be extended over the slave drive ring 110 of the further generating unit.

Use of the sleeve generally located around the central shaft of the wheel and having teeth which locate permanently into corresponding teeth of the wheel has a number of advantages. In particular, consistent drive can always be maintained without damaging the spindle of the stepper motor of the generating unit due to the flexible nature of the belt and the central nature of the drive through the sleeve. Use of the sleeve also means that the castor is relatively easy to assemble, service and resistant to ingress of dirt.

Figure 14:
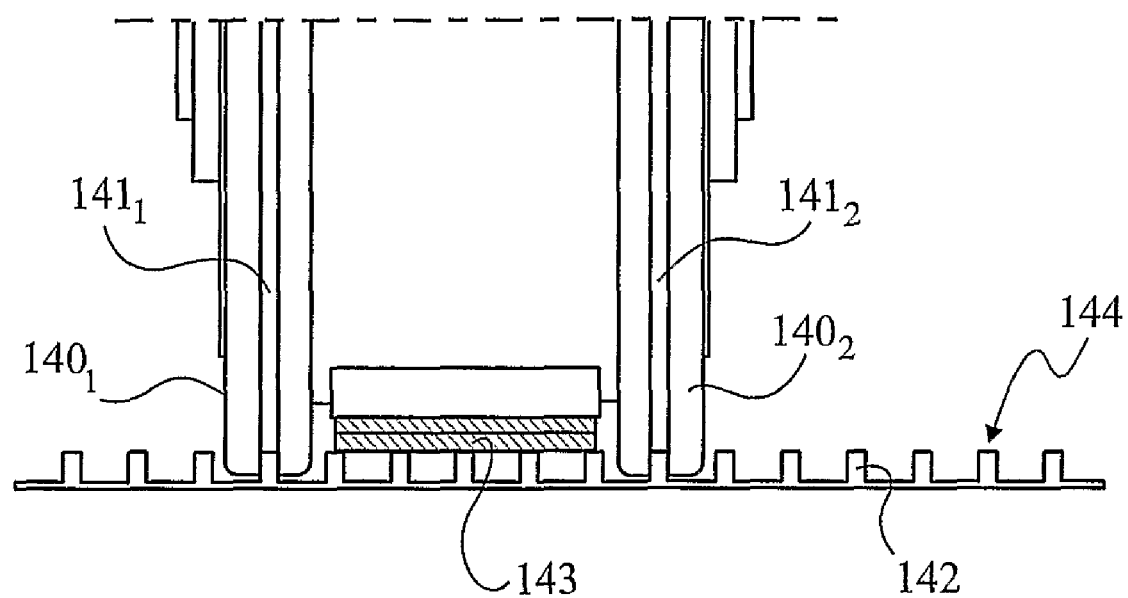
FIG. 14 illustrates motion of a castor on a travelator.

FIG. 14 illustrates how embodiments of the present invention can be utilised in a manner compatible with use of castors on shopping carts in an environment where the shopping carts are to be held in place on a travelator or escalator in a retail environment. Each wheel $140_1$, $140_2$ of the castor includes a central slot $141_1$, $141_2$ which is sized to encompass upwardly extending walls 142 on an upper surface of the travelator. When this occurs the bottom part of the housing between the wheels includes an engagement surface 143 which contacts an upper surface 144 of multiple walls. This disengages the wheels from the running surface and effectively locks the shopping cart in place whilst on the travelator.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A braking apparatus for braking a wheeled vehicle, comprising:
 a wheel for engaging a running surface, said wheel including at least one tooth region;
 at least one braking member associated with the wheel, said braking member being rotatable about a pivot axis between a non-braking position in which the wheel engages the running surface and a braking position in which a brake foot is juxtaposed between the wheel and the running surface;

a latch member secured to said braking member and movable between a first position in which said braking member is unlatched and a second position in which said braking member is latched to the tooth region of the wheel for rotation with the wheel into said braking position; and a latch actuating member arranged to interact magnetically with the latch member to determine the position in which said latch member is positioned.

2. The apparatus as claimed in claim 1, further comprising:
at least one of said latch member and/or said latch actuating member comprises a magnetic element, magnetic forces generated by said magnetic element determining a position of said latch member.

3. The apparatus as claimed in claim 2, further comprising:
when only one of said latch member or said latch actuating member comprises a magnetic element, a remainder of said latch member or said latch actuating member comprises a metal body.

4. The apparatus as claimed in claim 2, further comprising:
said latch actuating member comprises a first magnetic element and said latch member comprises a second magnetic element.

5. The apparatus as claimed in claim 4, further comprising:
said first magnetic element is arranged to attract said second magnetic element when said latch actuating member is in a braking position, the magnetic force of attraction being sufficient to move the latch member from said first position to said second position.

6. The apparatus as claimed in claim 4, further comprising:
said first magnetic element is arranged to repel said second magnetic element when said latch actuating member is in a non-braking position, the magnetic force of repulsion being sufficient to urge the latch member into said first position, said latch member being biased into said second position by a biasing member.

7. The apparatus as claimed in claim 1, wherein:
said at least one tooth region is arranged to engage with a leg member of said latch member when said latch member is moved to said second position.

8. The apparatus as claimed in claim 7, wherein:
said wheel is arranged to drive the braking member into a braking position when said tooth region is engaged with the leg member and said wheel is rotated.

9. The apparatus as claimed in claim 7, wherein:
said at least one tooth region comprises a plurality of recesses arranged circumferentially around an inner surface of said wheel.

10. The apparatus as claimed in claim 1, wherein:
said braking member comprises a brake arm member rotatable around an axis of said wheel and having said brake foot disposed at a first end thereof distal said axis.

11. The apparatus as claimed in claim 1, wherein:
a drive assembly arranged to drive said latch actuating member thereby selecting a position of said latch actuating member, said drive assembly comprising:
at least one solenoid;
a plunger orientated along an axis of said solenoid; and
a drive pin connecting said plunger to the latch actuating member; wherein
movement of the plunger responsive to energisation of a coil of said solenoid provides a corresponding rotation of said latch actuating member about a respective pivot point.

12. The apparatus as claimed in claim 11, further comprising:
said at least one solenoid comprises two solenoids disposed in an opposing arrangement, respective plungers of each solenoid being commonly connected via a connector so as to move together.

13. The apparatus as claimed in claim 1, further comprising:
a sensor for receiving wireless lock or unlock signals from a remote transmitter and generating corresponding control signals; and
control apparatus responsive to said control signals for energising or non-energising at least one solenoid of a drive assembly.

14. The apparatus as claimed in claim 1, further comprising:
a wheel housing including a housing body having a central plate member and oppositely facing housing body walls extending outwardly from opposite sides of the central plate around edge regions of the central plate thereby forming a H-shaped cross section for said housing, opposite sides providing respective compartments in which components of said apparatus are locatable.

15. The apparatus as claimed in claim 1, wherein:
the latch member is arranged to pivot about a pivot point, said first and second positions being pivotally spaced apart.

16. The apparatus as claimed in claim 1, wherein:
said latch actuating member is an elongate member having a respective pivot axis at a first end thereof and includes a drive shaft coaxial with said pivot axis whereby rotation of the drive shaft provides a pivoting motion of said latch actuating member about the pivot axis.

17. The apparatus as claimed in claim 16, wherein:
said elongate member has a second end thereof whereby said second end is located proximate to said latch member when said latch actuating member is pivoted to a first position and said second end is located distal to said latch member when said latch actuating member is pivoted to a second position.

18. The apparatus as claimed in claim 17, further comprising:
stopping elements which each includes a latch actuating member abutment surface and located at respective positions with respect to the latch actuating member to prevent further pivoting motion of the latch actuating member beyond said first and second positions.

19. The apparatus as claimed in claim 16, further comprising:
drive means for providing rotational forces to said drive shaft, said rotational forces causing said drive shaft to rotate.

20. The apparatus as claimed in claim 1, wherein said latch member is arranged so that gravitational forces cause a mass of the latch member to fall into said first position.

21. A method for braking a wheeled vehicle, comprising the steps of:
providing a wheel for engaging a running surface, said wheel including at least one tooth region;
providing a braking member that is associated with the wheel, said braking member being rotatable about a pivot axis between a non-braking position in which the wheel engages the running surface and a braking position in which a brake foot is juxtaposed between the wheel and the running surface, to which braking member is secured a latch member, said latch member being movable between a first position in which said braking member is unlatched and a second position in which said braking member is latched to the tooth region of the wheel for rotation therewith;
providing a latch actuating member that interacts magnetically with the latch to determine the position thereof, and selecting a position for said latch member via the latch actuating member to control movement of the braking member into the braking position.

22. A method as claimed in claim 21, further comprising the steps of:
generating magnetic forces between said latch member and said latch actuating member, said magnetic forces determining a position of said latch member.

23. The method as claimed in claim 22, further comprising the steps of:
attracting said latch member into said second position by locating said latch actuating member nearer to said latch member.

24. The method as claimed in claim 22, further comprising the steps of:
repelling said latch member into said first position by locating said latch actuating member nearer to said latch member.

* * * * *